United States Patent
Pidutti et al.

(10) Patent No.: US 7,042,743 B2
(45) Date of Patent: May 9, 2006

(54) POWER FACTOR CORRECTION DEVICE FOR SWITCHING POWER SUPPLIES

(75) Inventors: Albino Pidutti, Udine (IT); Claudio Adragna, Monza (IT)

(73) Assignee: STMicroelectronics s.r.l., Agrate Brianza (IT)

( * ) Notice: Subject to any disclaimer, the term of this patent is extended or adjusted under 35 U.S.C. 154(b) by 0 days.

(21) Appl. No.: 10/532,418

(22) PCT Filed: Sep. 20, 2002

(86) PCT No.: PCT/IT02/00602

§ 371 (c)(1),
(2), (4) Date: Apr. 22, 2005

(87) PCT Pub. No.: WO2004/027965

PCT Pub. Date: Apr. 1, 2004

(65) Prior Publication Data

US 2006/0044855 A1 Mar. 2, 2006

(51) Int. Cl.
*H02M 7/217* (2006.01)

(52) U.S. Cl. ...................................... 363/89
(58) Field of Classification Search ............... 323/207; 363/89
See application file for complete search history.

(56) References Cited

U.S. PATENT DOCUMENTS

| | | | | |
|---|---|---|---|---|
| 5,006,975 A | * | 4/1991 | Neufeld | 363/80 |
| 5,359,276 A | * | 10/1994 | Mammano | 323/207 |
| 5,619,405 A | * | 4/1997 | Kammiller et al. | 363/80 |
| 6,178,104 B1 | * | 1/2001 | Choi | 363/89 |
| 6,259,613 B1 | * | 7/2001 | Lee et al. | 363/89 |
| 6,728,121 B1 | * | 4/2004 | Ben-Yaakov et al. | 363/89 |
| 6,970,365 B1 | * | 11/2005 | Turchi | 363/81 |

* cited by examiner

*Primary Examiner*—Jeffrey Sterrett
(74) *Attorney, Agent, or Firm*—Lisa K. Jorgenson; Stephen Bongini; Fleit, Kain, Gibbons, Gutman, Bongini & Bianco P.L.

(57) ABSTRACT

A power factor correction device for switching power supplies is described, which comprises a converter (20) and a control device (100; 200; 300) coupled with said converter (20) in such a way as to obtain from a input network alternated voltage (Vin) a direct regulated voltage (Vout) at the output terminal. The converter (20) comprises a power transistor (M) and the control device (100; 200; 300) comprises an error amplifier (3) having in input at the inverting terminal a first signal (Vr) proportional to said regulated voltage (Vout) and at the non-inverting terminal a voltage reference (Vref), at least one capacitor (C) having a first terminal and a second terminal which are coupled respectively with the inverting terminal and the output terminal (31) of the error amplifier (3) and a driving circuit (4–6) of said power transistor (M) which is coupled with the second terminal of said capacitor (C). The control device (100; 200; 300) comprises interruption means (SW) placed between the output terminal (31) of said error amplifier (3) and the second terminal of said capacitor (C) and control means (103; 103, 301–303) able to activate said interruption means (SW) so as to control the interruption of the connection between the error amplifier (3) and said driving circuit (4–6) for at least one time period (T) lower than the time period (Tciclo) in which said control device (100; 200; 300) is operative.

21 Claims, 4 Drawing Sheets

POWER FACTOR CORRECTION DEVICE FOR SWITCHING POWER SUPPLIES

FIELD OF THE INVENTION

The present invention relates to a power factor correction device for switching power supplies.

BACKGROUND OF THE INVENTION

It is usually known to use devices to actively correct the power factor (PFC) for switching power supplies used in electronic equipments in common use as computers, televisions, monitors, etc. and for supplying fluorescent lamps, that is switching pre-regulator stages that must absorb from the external network a current that is almost sinusoidal and in phase with the network voltage. Therefore a switching power supply of the actual type comprises a PFC and a DC—DC converter connected with the output of the PFC.

A switching power supply of the conventional type comprises a DC—DC converter and an input stage connected with the electric network and constituted by a full wave rectifier diode bridge and by a capacitor connected immediately downstream for producing a non-regulated continuous voltage that is derived from the alternated sinusoidal network voltage. The capacitor has a capacitance great enough that a relative low undulation with respect to the continuous level is present at its terminals. The rectifier diodes of the bridge also will conduct only for a small portion of each half cycle of the network voltage because the instantaneous value thereof is lower than the voltage at the terminals of the capacitor for the greatest part of the cycle. Consequently the current absorbed from the network will be constituted by a series of narrow pulses the amplitude of which is 5–10 times the resulting average value.

This presents considerable consequences: the current absorbed from the network has peak values and effective values which are much higher than those in the case of absorbing sinusoidal current, the network voltage is distorted due to the almost simultaneous pulse absorption of all the users connected with the network, in the case of three-phase systems the current in the neutral conductor is increased and a low use of the power potentialities of the electric power systems occurs. In fact, the pulse current waveform has many odd harmonics which, even if they do not contribute to the power supplied to the load, contribute to increase the effective current absorbed from the network and also to increase the power dissipation.

Quantitatively this can be expressed both as Power Factor (PF), that is the ratio between the real power (that supplied to the load by the power supply which is added to the power dissipated internally as heat and the apparent power (the product of the network effective power by the absorbed effective power), and as Total Harmonic Distortion (THD), which usually is the percent ratio between the energy associated with all the superior level harmonics and that associated with the main harmonic. Usually a power supply provided with a capacitive filter has a PF comprised between 0.4 and 0.6 and a THD higher than 100%.

A PFC, placed between the rectifier bridge and the input of the DC—DC converter, allows there to be absorbed from the network a current which is almost sinusoidal and in phase with the voltage, by making the PF near 1 and by reducing the THD.

Figure 1:
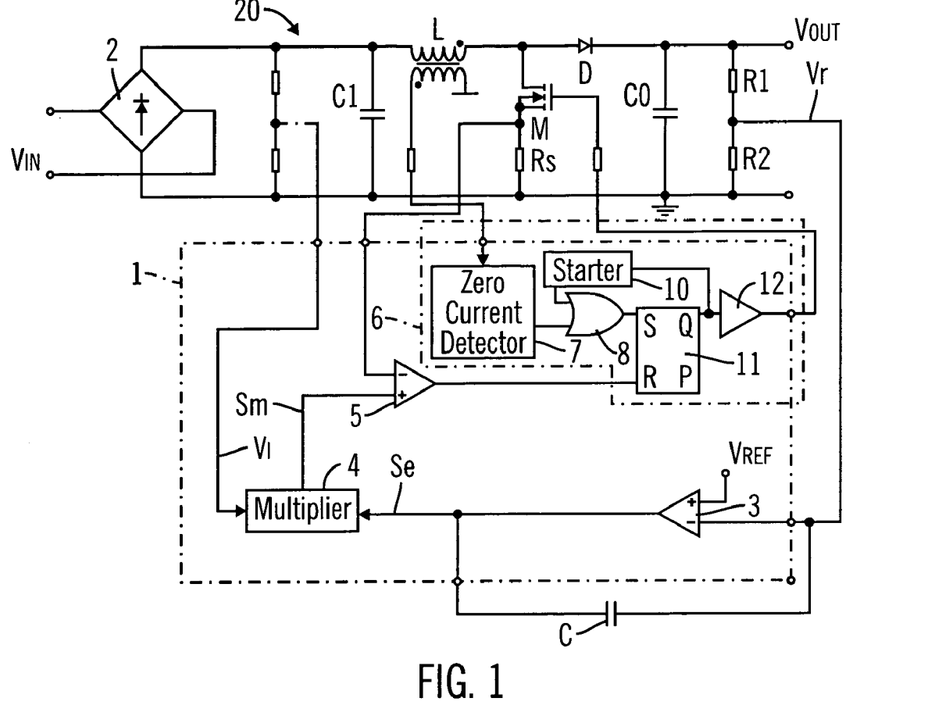
FIG. 1 is a circuit scheme of a PFC for a switching power supply according to the prior art.

In FIG. 1 a pre-regulator PFC stage is schematically shown comprising a boost converter 20 and a control device 1, in this case the control device L6561 produced by STMicroelectronics S.p.A. The boost converter 20 comprises a full wave diode rectifier bridge 2 having in input a network voltage Vin, a capacitor C1 (which serves as filter for the high frequency) having one terminal connected with the diode bridge 2 and the other terminal connected to ground, an inductor L connected with a terminal of the capacitor C1, a MOS power transistor M having the drain terminal connected with a terminal of the inductor L downstream of the last one and which has the source terminal connected with a resistor Rs connected to ground, a diode D having the anode connected with the common terminal of the inductor L and of the transistor M and the cathode connected with a capacitor Co having the other terminal connected to ground. The boost converter 20 generates an output direct voltage Vout at the terminals of the capacitor Co which is higher than the highest peak of the network voltage, typically 400V for systems supplied by a European network or by means of a universal supply. Such voltage Vout will be the input voltage of the DC—DC converter connected with the PFC.

The control device 1 must keep the output voltage Vout at a constant value by means of a feedback, control action. The control device 1 comprises an error operational amplifier 3 adapted to compare a part of the output voltage Vout, which is the voltage Vr given by Vr=R2*Vout/(R2+R1) (wherein the resistors R1 and R2 are connected in series with each other and are connected in parallel with the capacitor Co) with a voltage reference Vref, for example of the value of 2.5V, and it generates an error signal proportional to the difference thereof. The output voltage Vout presents an undulation at a frequency that is twice the network frequency and which is superimposed on the continuous value. However if the bandwidth of the error amplifier is considerably reduced (typically it is lower than 20 Hz) by means of a suitable compensation network comprising at least one capacitor and if operation in an almost stationary regime is assumed, that is if the input effective voltage and the load are constant, such undulation will be considerably reduced and the error signal will become constant.

The error signal Se is sent to a multiplier 4 wherein it is multiplied by a signal Vi that is a part of the network voltage rectified by the diode bridge 2. At the output of the multiplier 4 a signal Sm will occur which is given by a rectified sinusoid, the width of which will depend certainly on the network effective voltage and on the error signal Se.

The signal Sm is sent to the non-inverting input of a PWM comparator 5 while at the inverting input the signal Srs is applied, which signal occurs on the resistance Rs. If the signals Srs and Sm are equal the comparator 5 sends a signal to the control block 6 that is adapted to drive the transistor M and which, in this case, turns it off. In such a way the output signal Sm of the multiplier determines the peak current of the transistor M and it will be enveloped by a rectified sinusoid. A filter placed at the input of the stage eliminates the component at the commutation frequency and provides the current absorbed from the network the shape of the sinusoidal envelope. The block 6 comprises a block 7 adapted to detect the current zeros and able to send a pulse signal to an OR gate 8, the other input terminal of which is connected with a starter 10, which is adapted to send a signal to the OR gate 8 at the start time instant; the output signal S of the OR gate 8 is the set input of the set-reset flip-flop 11 which has another input R that is the output signal of the device 5, and which has an output signal Q. The signal Q is sent to the input of a driver 12 which controls the turning on and off of the transistor M.

The error amplifier 3 may be formed in two different ways: as a voltage amplifier, wherein the output voltage is proportional to the difference between the voltages at the input terminals, or as a transconductance amplifier, the output current of which is proportional to the difference between the voltages that are present at the input terminals. The use of the voltage amplifier as error amplifier is preferable for higher noise immunity thereof as in the aforementioned device L6561.

Since it is necessary to modify the transfer function of the loop gain for all the closed loop feedback control systems in order to assure the stability of the same loop and to provide for a satisfactory dynamic operation, in the case of the PFCs this is performed usually by modifying the frequency response of the error amplifier. By using a voltage amplifier as error amplifier, the compensation network comprises at least one capacitor C connected in feedback between the output and the inverting input of the amplifier 3.

One among the possible faults for a switching power supply provided with a PFC is the opening of the voltage control loop.

The more usual cause is due to the breaking of the resistor R1 of the output divider which is connected to the high voltage: in such case the system loses the information of the output voltage and the resistor R2 is inclined to bring the input of the error amplifier to ground. In such way the output is unbalanced towards the top and therefore the turning on of the transistor M is controlled for the maximum possible duration. Consequently the output voltage will increase without control bringing the load supplied by the PFC and the same PFC to destruction.

By using the error amplifier 3, the presence of the compensation network with the capacitor C connected between the output and the inverting input determines that the latter has the same potential of the other input for the whole period wherein the current may flow through the capacitor C, that is until the output of the error amplifier 3 has the possibility of increasing. When the output arrives at the top end of its dynamic or, as it is called, the error amplifier 3 is saturated high, the current does not flow through the capacitor and the inverting input may go to ground.

Figure 2:
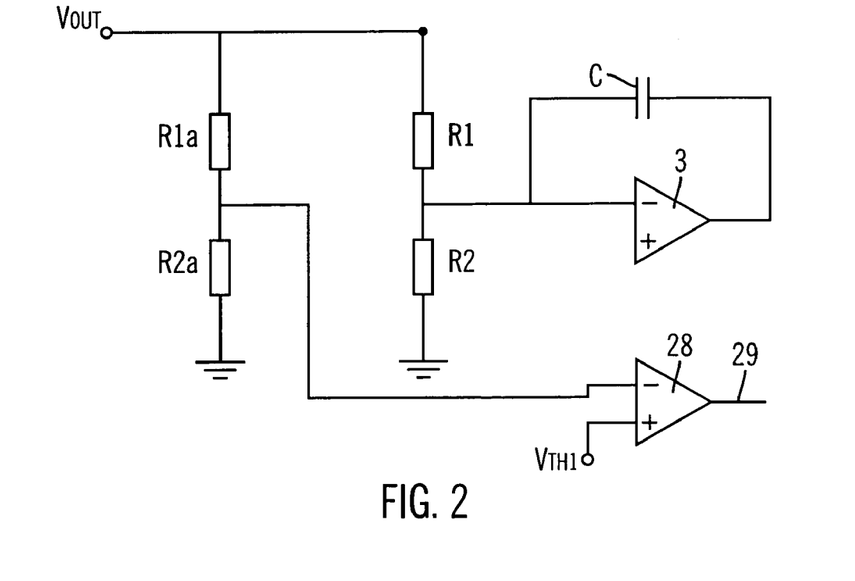
FIG. 2 shows a prior art circuit solution for the protection of the PFC in FIG. 1 in the case of the opening of the voltage loop.

In commerce there are integrated PFCs having a protection against the opening of the voltage control loop. The solution in such PFCs consists of adding a further resistive divider (constituted by the resistors R1a and R2a which are connected in series with each other) connected with the output of the PFC which allows to read the voltage and to use a further comparator 28 having the non-inverting input connected with a reference voltage Vth1. When the resistor R1a is opened, the voltage at the inverting input of the comparator 28 overcomes the voltage Vth1 and the output 29 of the comparator 28 will provide to turn off the transistor M.

This solution has the disadvantage to require either external components (a comparator and a reference voltage generator with respective passive components besides the resistor divider) or, in the case of integrated formation, an added pin dedicated to this function which is in the control device 1 of the PFC. In the last case it is possible to incur to a lack of available pins, thereby resulting impossible to integrate this function.

SUMMARY OF THE INVENTION

In view of the state of the art described, it is an object of the present invention to provide a power factor correction device for switching power supplies which overcomes the aforementioned disadvantages.

According to present invention, such object is obtained by means of a power factor correction device for switching power supplies, comprising a converter and a control device coupled with said converter in such a way as to obtain from a input network alternated voltage a direct regulated voltage at the output terminal, said converter comprising a power transistor and said control device comprising an error amplifier having in input at the inverting terminal a first signal proportional to said regulated voltage and at the non-inverting terminal a voltage reference, at least one capacitor having a first terminal and a second terminal which are coupled respectively with the inverting terminal and the output terminal of said error amplifier and a driving circuit of said power transistor which is coupled with the second terminal of said capacitor, characterized in that said control device comprises interruption means placed between the output terminal of said error amplifier and the second terminal of said capacitor and control means able to activate said interruption means so as to control the interruption of the connection between the error amplifier and said driving circuit for at least one time period lower than the time period in which said control device is operative.

Preferably said control device comprises comparison means adapted to compare the value of said first signal with a reference value, said comparison means being able to send a signal adapted to deactivate said power transistor and said control device when the connection between said error amplifier and said drive circuit is interrupted and when the value of said first signal is lower than the value of said reference signal.

Thanks to present invention it is possible to form a power factor correction device for switching power supplies which allows to protect the same PFC device when the value of the signal proportional to the output voltage and in input to the control device of the PFC goes to ground due to an opening of the control loop.

BRIEF DESCRIPTION OF THE DRAWINGS

The features and the advantages of the present invention will be made evident by the following detailed description of embodiments thereof, shown as not limiting examples in the annexed drawings, wherein.

DETAILED DESCRIPTION OF PREFERRED EMBODIMENTS

Figure 3:
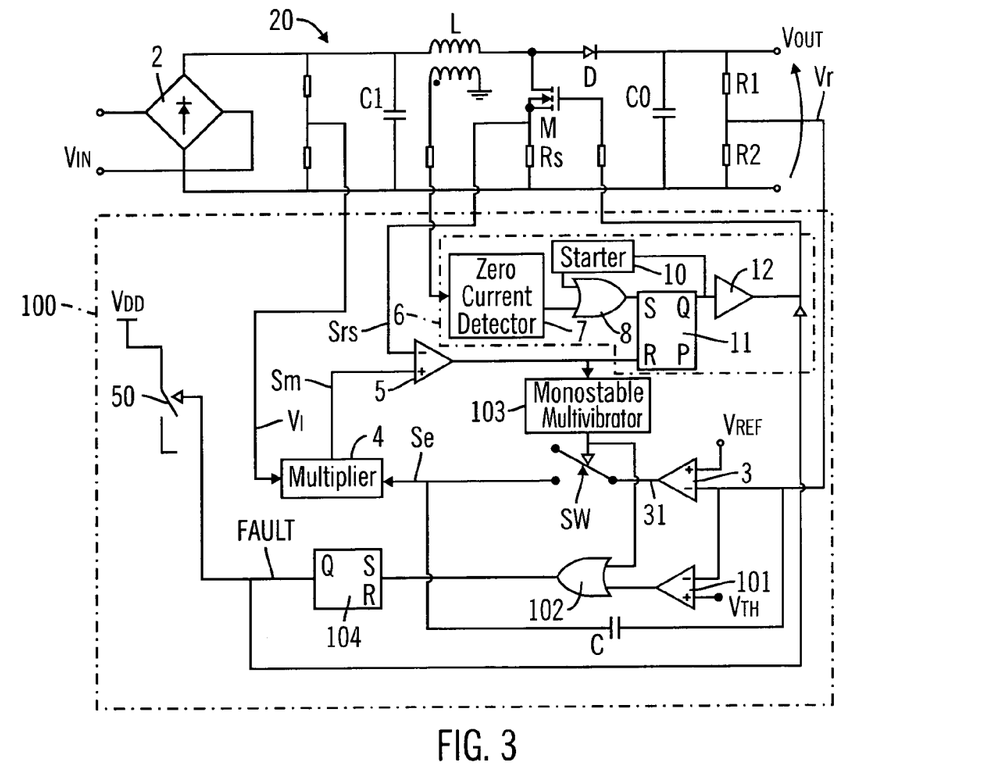
FIG. 3 is a circuit scheme of a PFC for a switching power supply according to a first embodiment of the present invention.

In FIG. 3 a circuit scheme of a PFC for a switching power supply according to a first embodiment of the present invention is shown; the elements equal to the circuit of FIG. 1 will be indicated by means of the same references. The PFC comprises a converter 20 provided with a full wave diode rectifier bridge 2 having in input a network voltage Vin, a capacitor C1 (which serves as filter for the high frequency) having one terminal connected with the diode bridge 2 and the other terminal connected to ground, an inductor L connected with a terminal of the capacitor C1, a MOS power transistor M having the drain terminal connected with a terminal of the inductor L downstream of the last and which has the source terminal connected with a resistor Rs connected to ground, a diode D having the anode connected with the common terminal of the inductor L and of the transistor M and the cathode connected with a capacitor Co having the other terminal connected to ground. The boost converter 20 generates an output direct voltage Vout at the terminals of the capacitor Co which is higher than the highest peak of the network voltage, typically 400V for systems supplied by a European network or by means of an universal supply. Such voltage Vout will be the input voltage of the DC—DC converter connected with the PFC.

The PFC comprises a control circuit 100 able to keep the output voltage Vout at a constant value by means of a feedback control action. The control device 1 comprises an error amplifier 3 adapted to compare a part of the output voltage Vout, which is the voltage Vr given by Vr=R2\*Vout/(R2+R1) (wherein the resistors R1 and R2 are connected in series with each other and are connected in parallel with the capacitor Co) with a voltage reference Vref, for example of the value of 2.5V, and it generates an error signal Se proportional to the difference thereof. The output voltage Vout presents an undulation at a frequency that is twice the network frequency and which is superimposed on the direct value. However if the bandwidth of the error amplifier is considerably reduced (typically it is lower than 20 Hz) by means of a suitable compensation network comprising at least one capacitor and if operation in an almost stationary regime is assumed, that is if the input effective voltage and a load are constant, such undulation will be considerably reduced and the error signal will become constant.

The error signal Se is sent to a multiplier 4 wherein it is multiplied by a signal Vi that is a part of the network voltage rectified by the diode bridge 2. At the output of the multiplier 4 a signal Sm will occur which is given by a rectified sinusoid, the width of which will depend certainly on the network effective voltage and on the error signal Se.

The signal Sm is sent to the non inverting input of a PWM comparator 5 while at the inverting input the signal Srs is applied which occurs on the resistance Rs. If the signals Srs and Sm are equal the comparator 5 sends a signal R to the set-reset flip-flop 11 belonging to the control block 6 for controlling the turning off of the transistor M.

The block 6 comprises a block 7 adapted to detect the current zeros and able to send a pulse signal to the OR gate 8 the other input terminal of which is connected with a starter 10, adapted to send a signal to the OR gate 8 at the start time instant; the output signal S of the OR gate 8 is the set input of the set-reset flip-flop 11 having another input R that is the output signal of the device 5, and which has an output signal Q. The signal Q is sent to the input of a driver 12 which controls the turning on and off of the transistor M.

In such a way the output signal Sm of the multiplier determines the peak current of the transistor M and it will be enveloped by a rectified sinusoid. A filter placed at the input of the stage eliminates the component at the commutation frequency and provides the current absorbed from the network the shape of the sinusoidal envelope.

The control circuit 100 comprises also a comparator 101 having the voltage signal Vr at the inverting input terminal and a voltage reference Vth at the non-inverting terminal. The output of the comparator is connected with one input of an AND gate 102, at the other input of which is present the output signal of a monostable multivibrator 103 controlled by the output signal of the PWM comparator 5. Alternatively the multivibrator 103 may be activated by a signal P, that is the negated signal Q, which is at the output of the flip-flop 11. The output of the AND gate 102 is connected with a set-reset flip-flop 104.

A switch SW is placed between the output terminal 31 of the error amplifier 3 and the terminal of the capacitor C which is coupled with the output of the error amplifier 3, and is controlled so as to interrupt the flow of the signal Se into the analog multiplier for a time period T when the comparator 5 sends the reset signal R to the flip-flop 11. The time period T is a small duration time period, for example 1 ms, that occurs in each operation cycle of the control device 100, that is for each period Tciclo comprising the on time Ton of the MOS transistor M and the off time Toff of the same transistor M.

In such way, by having the input terminal of the multiplier 4 disconnected from the output terminal of the error amplifier 3, if the resistor R1 is opened, the voltage Vr at the inverting input terminal of the error amplifier 3 goes immediately to ground. The comparator 101 detects such operation condition and sends a signal to the AND gate 102 which activates the flip-flop 104 able to send an output signal Fault (that is the signal Q of the flip-flop 104) that allows to interrupt the supply of the control circuit 100 by acting on the switch 50 placed between a supply voltage VDD and the circuits belonging to the control device 100; this determines the turning off of the PFC.

Figure 4:
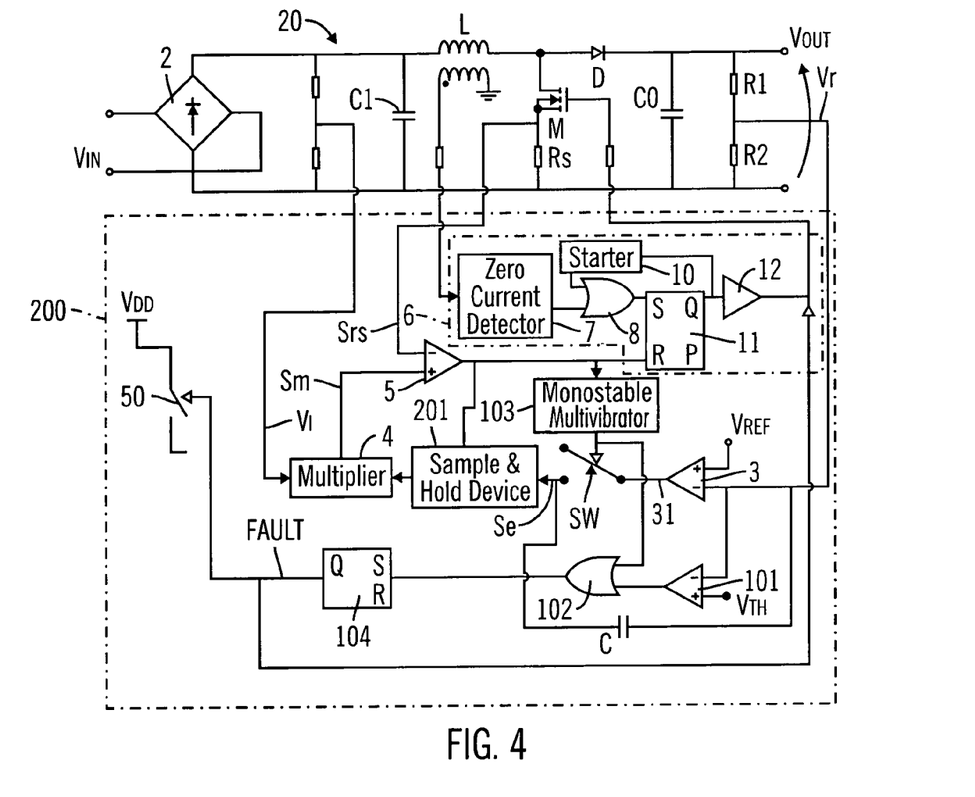
FIG. 4 is a circuit scheme of a PFC for a switching power supply according to a variant of a first embodiment of the present invention.

In FIG. 4 a circuit scheme of a PFC for a switching power supply according to a variant of the first embodiment of the present invention is shown. The PFC comprises the converter 20 and a control circuit 200 that is similar to the control circuit 100 in FIG. 3 except for comprising a holding sampling device 201 that is placed between the switch SW and the analog multiplier 4 and which is driven by the output terminal of the PWM comparator 5. The device 201 memorizes the value of the output signal Se of the error amplifier 3 when the reset signal R is emitted. In such a way the disturbances that may be inducted in the multiplier 4 during its normal operation because of the opening of the switch SW are reduced.

Figure 5:
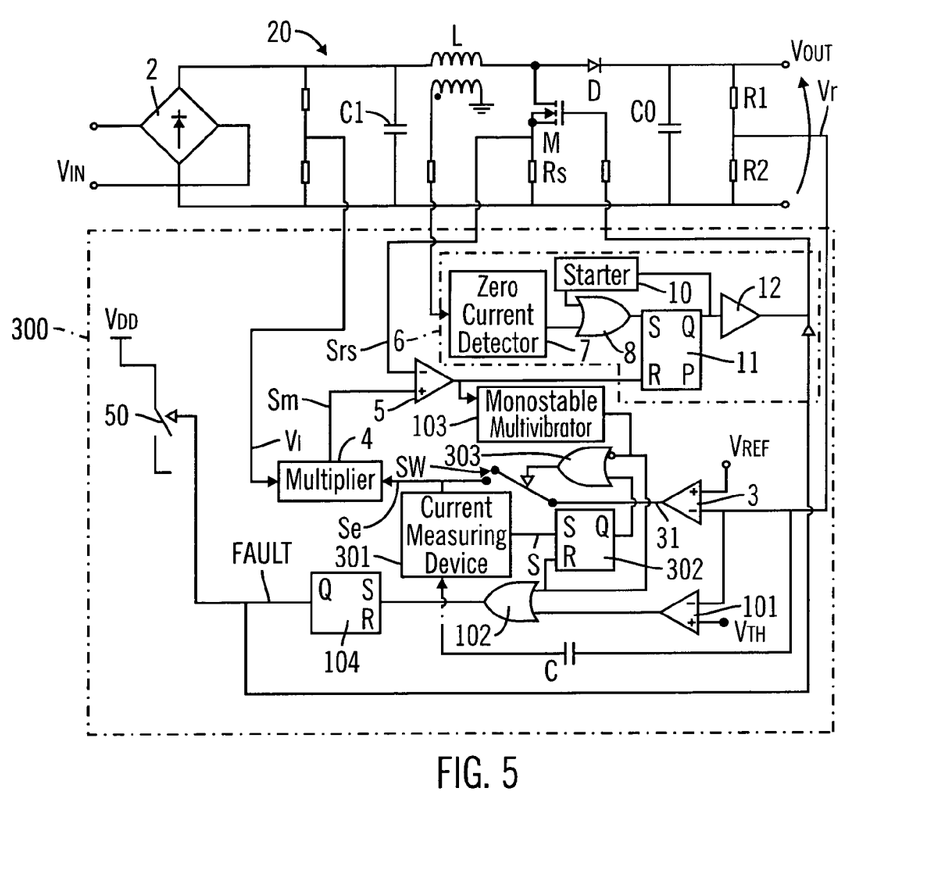
FIG. 5 is a circuit scheme of a PFC for a switching power supply according to a second embodiment of the present invention.

In FIG. 5 a circuit scheme of a PFC for a switching power supply according to a second embodiment of the present invention is shown. The PFC comprises a converter 20 and a control circuit 300 that is similar to the control circuit 100 in FIG. 3 except for comprising a device 301 able to measure the current Se furnished by the error amplifier 3 and which is placed between the input of the multiplier 4 downstream of the switch SW and the compensation capacitor C. Said current Se is compared with a current reference inside the device 301 and, if the current Se is higher than the current reference, it sends to the output a signal S which, in combination with the reset signal R sent by the PWM comparator 5, determines the opening of the switch SW. In more detail the control circuit 300 comprises also a set-reset flip-flop 302, the set signal of which is the signal S of the device 301 and the reset signal is the output signal of the multivibrator 102; an AND gate 303, which has in input the output signal Q of the flip-flop 302 and the negated output signal of the multivibrator 103, controls the switch SW which therefore is no longer controlled directly by the output signal of the multivibrator 103. The flip-flop 302 allows to avoid oscillations of the switch to be avoided.

Therefore by means of the control circuit 300 the switch SW is opened for a time period T having a prefixed duration, determined by the monostable multivibrator 103 and for example 1 μs, only if the current Se is higher than the current reference inside the device 301, where the time period T is lower than the time period Tciclo that is the time period in which the control device 300 is operative.

In all the circuit structures that are present in FIGS. 3, 4 and 5, the indicated circuit components belonging to the control circuits 100, 200 and 300 are integrated in the same chip.

What is claimed is:

1. A switching power supply comprising a power factor correction device and a DC—DC converter coupled to an output of the power factor correction device, wherein the power factor correction device includes:
   a boost converter including a power transistor and an output terminal; and
   a control device coupled to the boost converter so as to obtain, from an alternating voltage, a direct regulated voltage at the output terminal of the boost converter, wherein the control device includes:
      an error amplifier receiving at an inverting terminal a first signal that is proportional to the regulated voltage, and receiving at a non-inverting terminal a reference voltage;
      at least one capacitor having a first terminal coupled to the inverting terminal of the error amplifier, and a second terminal coupled to an output terminal of the error amplifier;
      a driving circuit for driving the power transistor of the boost converter, the driving circuit being coupled to the second terminal of the capacitor;
      an interruption circuit coupled between the output terminal of the error amplifier and the second terminal of the capacitor; and
      a control circuit for activating the interruption circuit so as to interrupt the connection between the error amplifier and the driving circuit for at least one time period, which is shorter than a time period in which the control device is operative.

2. The switching power supply according to claim 1, wherein the control device of the power factor correction device further includes a comparison circuit for comparing the first signal with a reference signal, the comparison circuit outputting a second signal for deactivating the power transistor and the control device when the connection between the error amplifier and the driving circuit is interrupted and when a value of the first signal is lower than a value of the reference signal.

3. The switching power supply according to claim 1, wherein the at least one time period consists of a fixed duration time period for each operation cycle of the control device.

4. The switching power supply according to claim 1, wherein the boost converter the power factor correction device further includes a diode rectifier circuit, and
   the driving circuit of the control device of the power factor correction device includes:
      a multiplier coupled to the error amplifier, the multiplier multiplying an output signal of the error amplifier and the capacitor with a second signal that is proportional to an output signal of the diode rectifier circuit; and
      a comparator for comparing an output signal of the multiplier with a third signal that is proportional to the current flowing in the power transistor, the control circuit being coupled to the output of the comparator and being activated when a value of the output signal of the multiplier is equal to a value of the third signal.

5. The switching power supply according to claim 4, wherein the control circuit of the control device of the power factor correction device includes a monostable multivibrator that, when activated, outputs a pulse signal to activate the interruption circuit.

6. The switching power supply according to claim 1, wherein the at least one time period is a fixed duration time period that occurs when the value of the output signal of the error amplifier and the capacitor is higher than a threshold value.

7. The switching power supply according to claim 1,
   wherein the boost converter of the power factor correction device further includes an input stage comprising a diode rectifier circuit,
   the driving circuit of the control device of the power factor correction device includes:
      a multiplier coupled to the error amplifier, the multiplier multiplying an output signal of the error amplifier and the capacitor with a second signal that is proportional to an output signal of the diode rectifier circuit; and
      a comparator for comparing an output signal of the multiplier with a third signal that is proportional to the current flowing in the power transistor, and the control circuit of the control device of the power factor correction device includes:
      a monostable multivibrator that is coupled to the output of the comparator and is activated when a value of the output signal of the multiplier is equal to a value of the third signal; and
      a detecting circuit for detecting a value of the current flowing through the capacitor, comparing that value with a reference current, and outputting a fourth signal when the current flowing through the capacitor is higher than the reference current, the fourth signal causing activation of the interruption circuit when the monostable multivibrator is activated.

8. A power factor correction device for switching power supplies, said power factor correction device comprising:
   a converter including a power transistor and an output terminal; and
   a control device coupled to the converter so as to obtain, from an alternating voltage, a direct regulated voltage at the output terminal of the converter,
   wherein the control device includes:
      an error amplifier receiving at an inverting terminal a first signal that is proportional to the regulated voltage, and receiving at a non-inverting terminal a reference voltage;
      at least one capacitor having a first terminal coupled to the inverting terminal of the error amplifier, and a second terminal coupled to an output terminal of the error amplifier;
      a driving circuit for driving the power transistor of the converter, the driving circuit being coupled to the second terminal of the capacitor;
      an interruption circuit coupled between the output terminal of the error amplifier and the second terminal of the capacitor; and
      a control circuit for activating the interruption circuit so as to interrupt the connection between the error amplifier and the driving circuit for at least one time period, which is shorter than a time period in which the control device is operative.

9. The power factor correction device according to claim 8, wherein the converter further includes an input stage comprising a diode rectifier circuit, the driving circuit of the control device includes:
- a multiplier coupled to the error amplifier, the multiplier multiplying an output signal of the error amplifier and the capacitor with a second signal that is proportional to an output signal of the diode rectifier circuit; and
- a comparator for comparing an output signal of the multiplier with a third signal that is proportional to the current flowing in the power transistor, and the control circuit includes:
- a monostable multivibrator that is coupled to the output of the comparator and is activated when a value of the output signal of the multiplier is equal to a value of the third signal; and
- a detecting circuit for detecting a value of the current flowing through the capacitor, comparing that value with a reference current, and outputting a fourth signal when the current flowing through the capacitor is higher than the reference current, the fourth signal causing activation of the interruption circuit when the monostable multivibrator is activated.

10. The power factor correction device according to claim 9, wherein the at least one time period is a fixed duration time period that occurs when the value of the output signal of the error amplifier and the capacitor is higher than a threshold value.

11. The power factor correction device according to claim 9, wherein the control device further includes:
- a comparison circuit for comparing the first signal with a reference signal, the comparison circuit outputting a fifth signal;
- an AND gate receiving an output signal of the monostable multivibrator and the fifth signal; and
- a set-reset flip-flop receiving, at a set input, an output signal of the AND gate, the set-reset flip-flop producing an output signal that deactivates the power transistor and the control device when the connection between the error amplifier and the driving circuit is interrupted and when a value of the first signal is lower than a value of the reference signal.

12. The power factor correction device according to claim 11, wherein the control circuit, the interruption circuit, and the comparison circuit are integrated in the same chip as the control device.

13. The power factor correction device according to claim 8, wherein the at least one time period is a fixed duration time period that occurs when the value of the output signal of the error amplifier and the capacitor is higher than a threshold value.

14. The power factor correction device according to claim 8, wherein the at least one time period consists of a fixed duration time period for each operation cycle of the control device.

15. The power factor correction device according to claim 8, wherein the converter further includes a diode rectifier circuit, and the driving circuit of the control device includes:
- a multiplier coupled to the error amplifier, the multiplier multiplying an output signal of the error amplifier and the capacitor with a second signal that is proportional to an output signal of the diode rectifier circuit; and
- a comparator for comparing an output signal of the multiplier with a third signal that is proportional to the current flowing in the power transistor, the control circuit being coupled to the output of the comparator and being activated when a value of the output signal of the multiplier is equal to a value of the third signal.

16. The power factor correction device according to claim 15, wherein the at least one time period consists of a fixed duration time period for each operation cycle of the control device.

17. The power factor correction device according to claim 15, wherein the control circuit includes a monostable multivibrator that, when activated, outputs a pulse signal to activate the interruption circuit.

18. The power factor correction device according to claim 17, wherein the control device further includes a sampling circuit coupled to the multiplier, the second terminal of the capacitor, and the output of the comparator, the sampling circuit storing a value of the output signal of the error amplifier and the capacitor when the control circuit is activated.

19. The power factor correction device according to claim 18, wherein the control device further includes:
- a comparison circuit for comparing the first signal with a reference signal, the comparison circuit outputting a fifth signal;
- an AND gate receiving an output signal of the monostable multivibrator and the fifth signal; and
- a set-reset flip-flop receiving, at a set input, an output signal of the AND gate, the set-reset flip-flop producing an output signal that deactivates the power transistor and the control device when the connection between the error amplifier and the driving circuit is interrupted and when a value of the first signal is lower than a value of the reference signal.

20. The power factor correction device according to claim 8, wherein the control device further includes a comparison circuit for comparing the first signal with a reference signal, the comparison circuit outputting a second signal for deactivating the power transistor and the control device when the connection between the error amplifier and the driving circuit is interrupted and when a value of the first signal is lower than a value of the reference signal.

21. The power factor correction device according to claim 20, wherein the control circuit, the interruption circuit, and the comparison circuit are integrated in the same chip as the control device.

* * * * *

UNITED STATES PATENT AND TRADEMARK OFFICE
CERTIFICATE OF CORRECTION

| | | |
|---|---|---|
| PATENT NO. | : 7,042,743 B2 | |
| APPLICATION NO. | : 10/532418 | |
| DATED | : May 9, 2006 | |
| INVENTOR(S) | : Albino Pidutti et al. | |

It is certified that error appears in the above-identified patent and that said Letters Patent is hereby corrected as shown below:

On the front page, under "Inventors" Item (75), add -- Mauro FAGNANI, Nerviano (IT) --.

Signed and Sealed this

Eighth Day of August, 2006

JON W. DUDAS
*Director of the United States Patent and Trademark Office*